US005682623A

United States Patent [19]
Fenoglio

[11] Patent Number: 5,682,623
[45] Date of Patent: Nov. 4, 1997

[54] PORTABLE, COLLAPSIBLE TOILET

[75] Inventor: Robert J. Fenoglio, New Lenox, Ill.

[73] Assignee: Fentool, Inc., New Lenox, Ill.

[21] Appl. No.: 688,537

[22] Filed: Jul. 30, 1996

[51] Int. Cl.$^6$ .................................................. A47K 11/02
[52] U.S. Cl. ........................ 4/483; 4/449; 4/460; 4/484; 297/440.12
[58] Field of Search ............................... 4/449, 460, 479, 4/483, 484; 297/440.12; 229/131.1, 149; 220/404

[56] References Cited

U.S. PATENT DOCUMENTS

| | | |
|---|---|---|
| 2,849,726 | 9/1958 | Vay . |
| 2,893,017 | 7/1959 | Beck . |
| 2,912,702 | 11/1959 | Mackenzie . |
| 3,097,016 | 7/1963 | Bigler, Jr. ............................ 297/440.12 |
| 3,118,146 | 1/1964 | Dorey . |
| 3,126,140 | 3/1964 | Lizan et al. ......................... 297/440.12 |
| 3,159,848 | 12/1964 | Arndt, Jr. . |
| 3,600,719 | 8/1971 | Karr ............................................ 4/484 |
| 4,710,989 | 12/1987 | Grenthe . |
| 4,995,122 | 2/1991 | Mohnhaupt . |
| 5,040,249 | 8/1991 | Diaz . |
| 5,129,111 | 7/1992 | Feinzilberg et al. . |
| 5,187,819 | 2/1993 | Grimes . |
| 5,356,022 | 10/1994 | Tipps ..................................... 229/131.1 |
| 5,524,301 | 6/1996 | McGuire ................................. 4/449 |

OTHER PUBLICATIONS

Statement Regarding Prior Sale of a Device Similar to the Claimed Device.

Primary Examiner—Henry J. Recla
Assistant Examiner—Charles R. Eloshway
Attorney, Agent, or Firm—Wood, Phillips, VanSanten, Clark & Mortimer

[57] ABSTRACT

A portable, collapsible toilet made of a blank of foldable material and having a row of four side-by-side panels (10), (14), (16), (18) connected by three fold lines (48), (50), (52) to define front, rear and opposed side panels. A top panel 12 is secured to the rear panel (18) by a fold line (28) and includes an opening (20) that may be closed by an integral lid (22). When assembled in a rectangular configuration, a plastic bag (96) may be nested between the panels (10), (14), (16), (18) and the top panel (12) closed thereon.

17 Claims, 3 Drawing Sheets

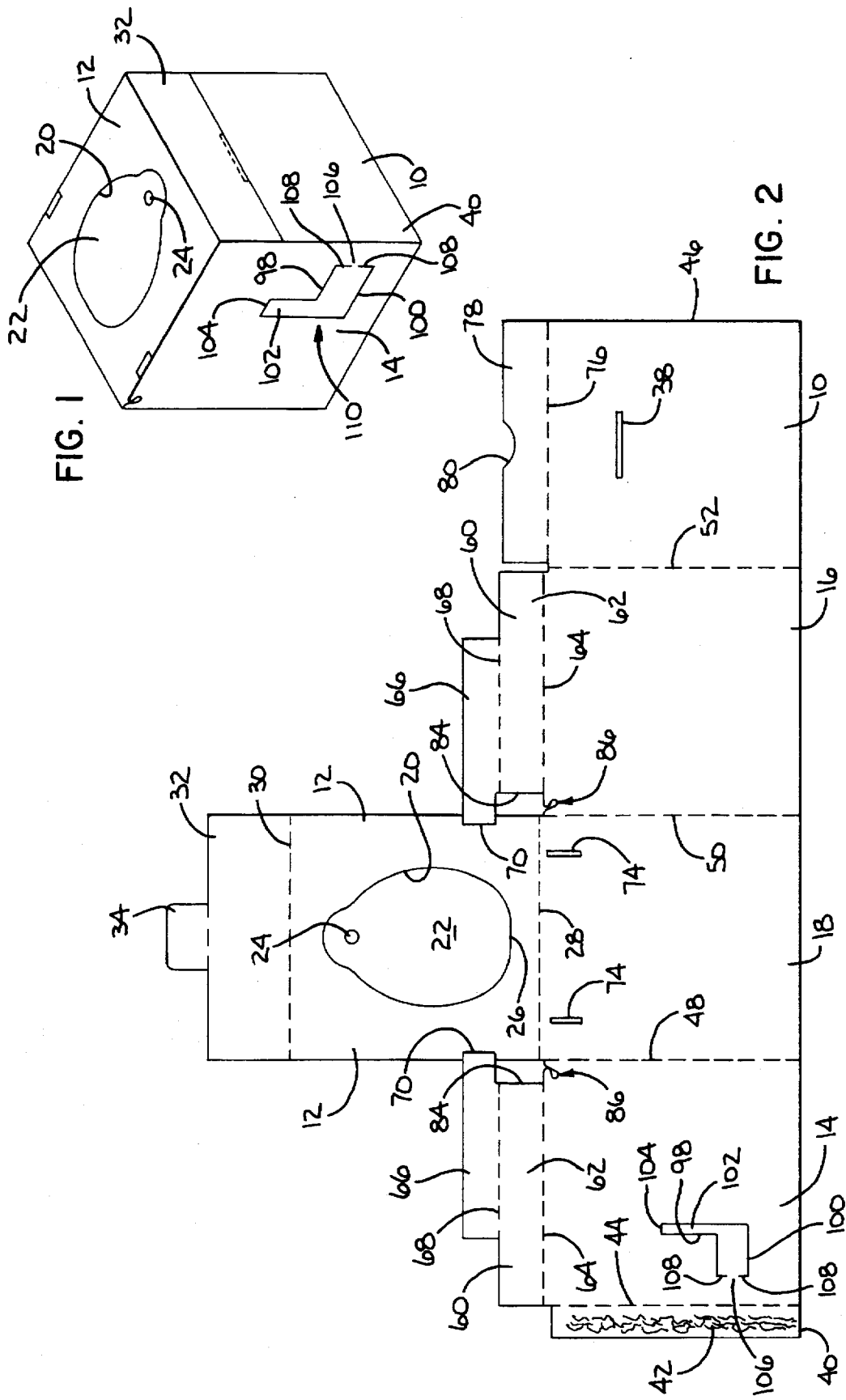

PORTABLE, COLLAPSIBLE TOILET

FIELD OF THE INVENTION

This invention relates to a portable toilet, and more particularly to a portable and collapsible toilet that is easy to assemble, convenient to transport, and is strong enough to support the weight of a heavy adult.

BACKGROUND OF THE INVENTION

Due to the popularity of outdoor sports such as fishing, hiking and camping, and the ever increasing mobility of people around the country, there is a need for toilet facilities in locations where permanent bathroom facilities are not available. Both children and adults alike, can in various settings, find themselves in need of toilet facilities. As a result, a temporary toilet which can easily be carried by a person, transported in a motor vehicle, or carried along in a person's hiking or camping gear would be particularly desirable. Additionally, a temporary toilet which can support the weight of a heavy adult is also desirable.

Portable toilets, per se, have existed for sometime, and have typically been constructed of foldable sheet materials. Numerous types of sheet materials such as cardboard, corrugated board, paperboard, and fiberboard have all been used in the construction of portable toilets. Portable collapsible toilets have also typically been assembled from several parts which have been glued, stapled, snapped, taped or stitched together. In some cases, selected parts of a portable toilet, or even the entire toilet, has been assembled from a single foldable form.

Today's existing portable toilets, which are assembled from a single, foldable form or blank, can be complicated and time consuming to assemble as is seen in Vay, U.S. Pat. No. 2,849,726. In the Vay, '726 patent there are numerous tabs and slots which align in different ways, to form either a triangular commode or a rectangular case like configuration. Assembly is difficult.

In addition, the existing portable collapsible toilets which are assembled from a single foldable form are not strong enough to withstand the weight of a heavy adult.

The present invention is directed toward overcoming one or more of the problems discussed above.

SUMMARY OF THE INVENTION

It is the principal object of the invention to provide a new and improved portable collapsible toilet which is easy to assemble from a single blank of a foldable material. It is also an object of the invention to provide a portable, collapsible toilet which is convenient to transport and can support the weight of a heavy adult.

According to one aspect of the invention, the above objects are realized in a portable, collapsible toilet made of a rigid but foldable material having a row of four side by side panels connected by three fold lines. A front panel, a rear panel and opposed side panels are defined in the row, with the endmost one of the panels including a flap for securement to the other endmost panel of the row. The two opposed side panels, at their upper edges, include foldable tabs of a length sufficient to extend over an intermediate one of the panels located between the opposed side panels. The intermediate panel includes first and second notches each located near respective ones of the opposed side panels, for receipt of the tabs. The tabs form opposed support surfaces at the upper edges of the opposed side panels.

A seat panel is connected by a fourth fold line to one of the panels other than the opposed side panels, at an upper edge of the panel, and has a flap adapted to overlie the upper edge of the remaining one of the four panels. The seat panel is adapted to overlie the opposed support surfaces, and the flap of the seat panel includes a tongue which is received into a notch in the remaining one of the four panels. The seat panel also includes a seat opening.

In another aspect of the present invention, the seat opening is defined by a die cut in the seat panel. The die cut also forms a lid for selectively covering the seat opening. The lid is hinged to the seat panel at a point adjacent the upper edge of the intermediate panel, where the die cut is interrupted.

In a preferred embodiment, a second flap is connected to the upper edge of the remaining of one of the four panels, by a fifth fold line. This second flap extends into partial underlying relation with the lid of the seat panel to act as a stop for the lid.

In a preferred embodiment, the two foldable tabs of the opposed side panels each include a first section connected to the upper edge of the corresponding opposed side panel at a sixth fold line, and a second section connected to the first section opposite the sixth fold line at a seventh fold line. The second sections include noses, which are received in respective ones of the first and second notches.

In a preferred embodiment, notches for receiving the upper open end of a plastic bag to be nested within the four panels, are located in the two opposed side panels adjacent the one of the intermediate panel, and the fourth fold line.

In a preferred embodiment, the notches have narrow openings and enlarged bottoms. The sides of the notches at the openings are in substantial abutment with one another to provide a means for gripping a plastic bag.

Other objects and advantages of the invention will become apparent from the following specification taken in conjunction with the accompanying drawings.

DESCRIPTION OF THE DRAWINGS

FIG. 1 is a perspective view of one embodiment of a portable, collapsible toilet of the present invention;

FIG. 2 is a plan view of a blank used to form the portable, collapsible toilet;

DESCRIPTION OF THE PREFERRED EMBODIMENTS

Figure 3:
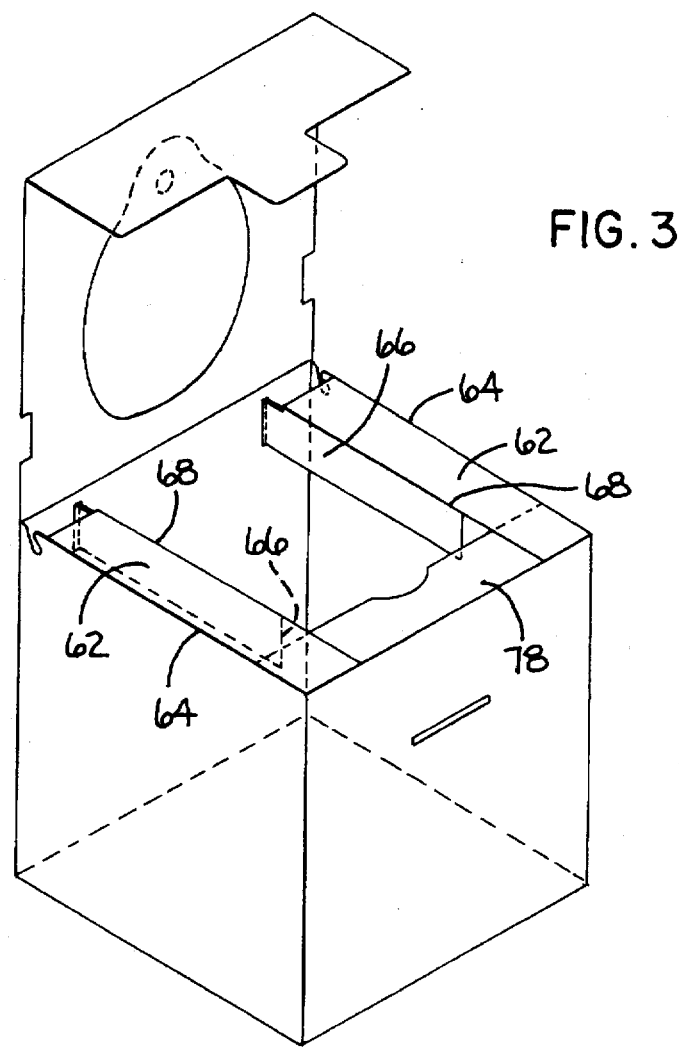
FIG. 3 is an enlarged fragmentary view of a bag holding notch.

An exemplary embodiment of a portable, collapsible toilet made according to the invention is illustrated in the drawings and with reference to FIG. 1, is seen to be in the general shape of a rectangular solid having a front panel 10, a top or seat panel 12, side panels 14 and 16 (only one of which is shown in FIG. 1), and a rear panel 18 (FIG. 2).

The top or seat panel 12 includes an opening 20 of generally oval shape which is normally closed by a lid 22. An aperture 24 in the lid 22 provides a means whereby the lid 22 may be grasped and moved from the position illustrated in FIG. 1 approximately 90° or more to a position exposing the opening 20 so that the toilet may be used. After use, the lid 22 may be returned to the position shown in FIG. 1 to essentially close the interior of the toilet from the surrounding area.

In a preferred embodiment, the toilet is made of a one piece blank of corrugated cardboard or other generally rigid but foldable material. For example, corrugated plastic sheets could also be used.

The opening 20 is formed by die cutting the top panel 12 except for a small region 26 oppositely of the finger hole 24. The lack of a die cut in the region 26 forms a connection to the remainder of the panel 12 which acts as a hinge for guiding the lid 22 between the open and closed positions.

The top panel is joined to the upper edge of the rear panel 18 at a fold line 28. Oppositely of the fold line 28, the top panel has a fold line 30 which separates the main part of the panel 12 from a flap 32 which in turn is provided with a tongue 34 which extends oppositely from the fold line 30. The front panel 10 includes a horizontal, elongated notch 38 located to receive the tongue 34 with the flap 32 folded partially over the front panel 10. This construction assures that the top panel 12 will remain in a generally horizontal position when assembled to the remaining panels 10, 14, 16 and 18.

The side panel 14 includes a vertical flap 40 provided with adhesive 42 and separated from the side panel 14 by a fold line 44. The flap 40 and the adhesive 42 thereon are brought into overlying relationship with the vertical end edge 46 of the front panel 10 and secured thereto by the adhesive 42.

The side panel 14 and the rear panel 18 are separated by a fold line 48 while the rear panel 18 and the side panel 16 are separated by a further fold line 50. The front panel 10 and the side panel 16 are separated by a fold line 52.

As a result of this construction, with the flap 40 glued to the front panel 10, it will be appreciated that the portable, collapsible toilet of the invention can be collapsed into a structure having the approximate facial area of any one of the panels 10, 12, 16, 18 and with a thickness of approximately five times the thickness of one of the panels. Thus, when collapsed, the toilet itself is extremely compact.

At their upper edges, each of the side panels 14 and 16 includes a two-part flap 60. As one flap 60 is essentially the mirror image of the other, only one will be described.

Each two-part flap 60 includes a seating section 62 which is connected by a fold line 64 to the upper edge of the corresponding one of the side panels 14, 16. A nose mounting section 66 is in turn connected by a fold line 68 to the section 62 oppositely of the fold line 64. The sections 66 include noses 70 that require the formation of small notches in opposite sides of the top panel 12.

The rear panel 18, just inwardly of each of the fold lines 48 and 50, and just below the horizontal fold line 28, is provided with vertical notches 74. The notches 74 are spaced from the adjacent fold line 48 or 50 a distance equal to the width of the seating section 62 of the flap 60.

Figure 5:
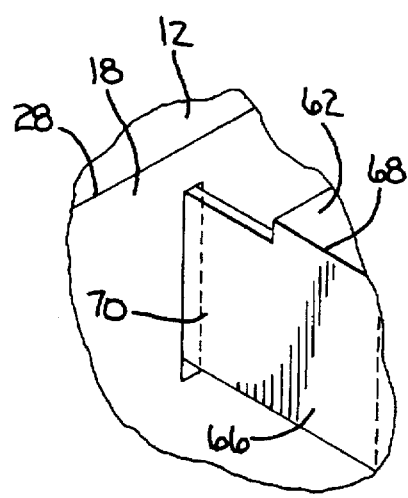
FIG. 5 is an enlarged, fragmentary perspective view of a nose of a tab inserted into a notch in one of the panels.
Figure 4:
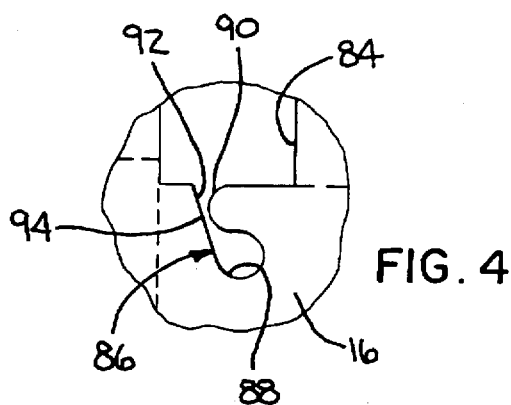
FIG. 4 is a perspective view of the portable, collapsible toilet, shown with a seat panel not yet overlying the upper edges of the other four panels.

As can be seen in FIGS. 4 and 5, the flaps 60 are arranged such that the seating section 62 is horizontal and the section 66 vertical. The noses 70 are introduced into a corresponding one of the notches 74. In this way, the section 62 provides support for the sides of the top or seat panel 12 when the same is in the position shown in FIG. 1 and enable the portable, collapsible toilet of the invention to support large adults weighing up to 300 lbs.

The front panel 10, at its upper edge, includes a fold line 76 by which a flap 78 is joined to the panel 10. The flap 78, as seen in FIG. 4, is adapted to be folded inwardly toward the interior of the toilet and underlie the flap sections 60. The flap 78 thus provides some support for the forward edge of the top or seat panel 12. It also provides the function of acting as a stop for the lid 22 preventing the same from being pushed down into the interior of the toilet past the closed position illustrated in FIG. 1. In this regard, if desired, the flap 78 may be provided with an arcuate notch 80 that is close to being in alignment with the die cut forming the opening 20 but located just slightly inwardly thereof so as to be in interference relation with the lid 22.

Returning to the two-part flaps 60, it will be seen that adjacent the fold lines 48 and 50, the seating sections 62 are cut away as illustrated at 84. A notch, generally designated 86, is located in the upper edge of each of the panels 14 and 16 in alignment with the cut away 84. Each notch 86 includes a rounded, enlarged bottom section 88. Oppositely of the bottom section 88, each notch includes one curved side 90, and a flat side 92, which diverge from one another as the upper edge of the corresponding panel 14 or 16 is approached. A very narrow neck section 94 is with the sides 90, 92 in substantial abutment disposed between the bottom section 88 and the entrance to the notch.

Figure 6:
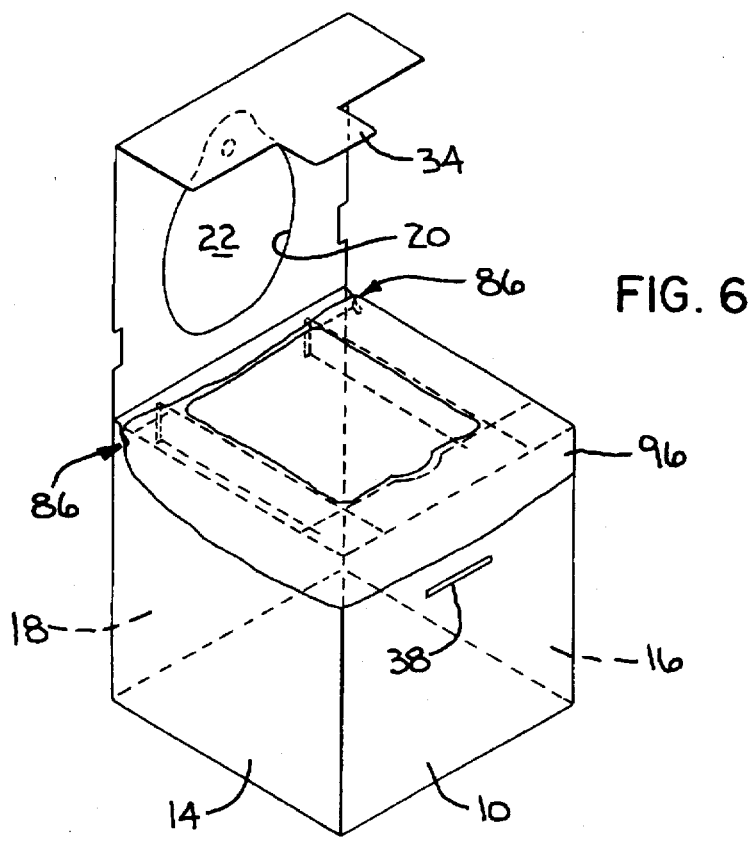
FIG. 6 is a perspective view of the portable, collapsible toilet of the present invention, illustrating a plastic bag positioned inside the toilet.

As can be seen in FIG. 6, with the toilet almost fully assembled, but before the tongue 34 is introduced into the notch 38, a plastic bag 96 may be disposed within the toilet with its upper edge overlapping the front panel 10 and the two side panels 14 and 16. The rear upper edge of the bag 96 may be somewhat gathered and pulled into each of the notches 86 on each of the side panels 14 and 16. Because the notches 86 are located in close adjacency to the rear panel 18, it will be appreciated that the plastic bag 96 will fully underlie the opening 20 to be in a position to receive human waste when the toilet is used. The shape of the notches 86 results in the gathered edge of the bag 96 being pinched and held in place.

The toilet may be used one or more times before changing the bag 96. When it is desired to no longer use the toilet, the bag 96 may be simply removed and it and its contents disposed of appropriately. If desired, the toilet may be refolded for subsequent reuse simply by removing the tongue 34 from the notch 38 and removing the tongues 70 from the notches 74. The various flaps may be returned to a position that is generally co-planar with the panel to which they are attached and then all panels folded on the fold line to return the toilet to its original compact shape.

Figure 7:
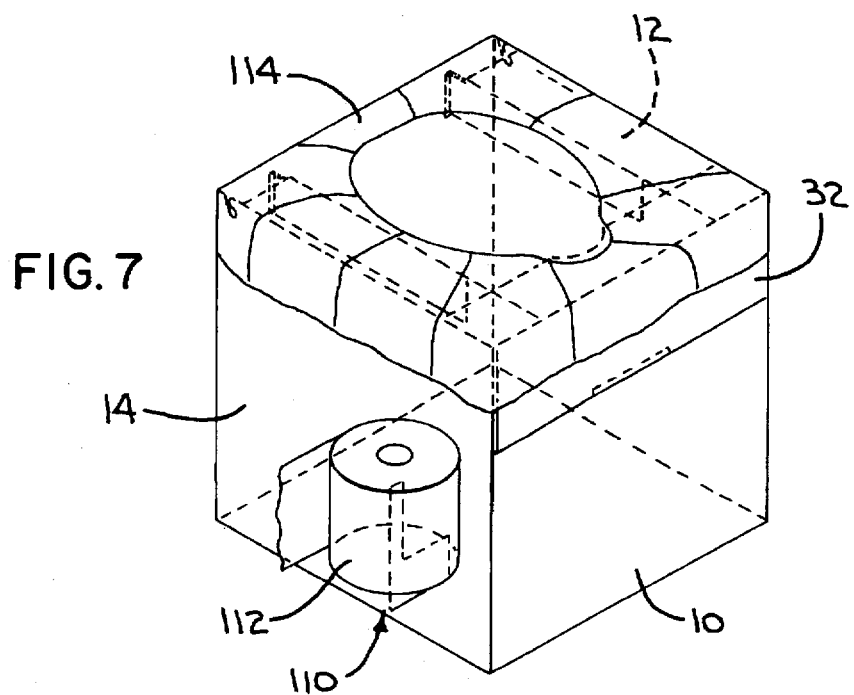
FIG. 7 is a view similar to FIG. 1 but of a modified embodiment of the invention.

Referring to FIGS. 1, 2 and 7, it will be seen that the side panel 14 includes parallel, L-shaped die cuts 98 and 100. The die cuts 98 and 100 are arranged so as to provide an upright leg 102 which is defined in part by a die cut 104 extending between the die cuts 98 and 100 at their uppermost extent. A hinge 106 having a vertical axis is defined by two cuts 108 which extend towards each other but do not contact each other at the opposite ends of the die cuts 98, 100 from the cut 104. The resulting structure defines a toilet paper holder, generally designated 110. As seen in FIG. 7, the toilet paper holder 110 may be pushed out of the plane of the side panel 14 to be approximately transverse thereto and then a roll of toilet paper 112 impaled on the upright leg 102.

FIG. 7 also illustrates another possible modification of the invention wherein the lid 22 is removed from the assemblage entirely and a plastic bag 114 fitted entirely over the top panel 12 to fit within the portable toilet.

From the foregoing, it will be appreciated that a portable, collapsible toilet made according to the invention is highly advantageous in that storage room is minimal because of its ability to fold upon itself. Its unique construction makes it capable of supporting even heavy adults to provide for essentially universal use.

Moreover, the unique means by which a plastic bag 96 may be fitted to or removed from the toilet enables the same to be reused as desired.

I claim:

1. A portable, collapsible toilet made of a blank of rigid but foldable material, said blank having a row of four side by side panels connected by three fold lines to define a front panel, a rear panel and opposed side panels;

an endmost one of said panels in said row having a fastening means for securement to the other endmost panel in said row;

two opposite ones of said panels at their upper edges including foldable tabs of a length sufficient to overlap an intermediate one of the panels located between said opposite ones of said panels;

first and second notches in said intermediate panel near respective ones of said opposite ones of said panels for receipt of said tabs whereby said tabs form opposed support surfaces at the upper edges of said opposite ones of said panels;

a seat panel connected by a fourth fold line to one of said panels other than said opposite ones of said panels at an upper edge thereof and having a flap adapted to overlie the upper edge of the remaining one of said four panels and said support surfaces;

means for securing said flap to said remaining one of said panels; and a seat opening in said seat panel.

2. The portable, collapsible toilet of claim 1 wherein said seat opening is defined by a die cut in said seat panel, said die cut being interrupted to define a hinge whereby that part of said seat panel within said die cut forms a lid for selectively covering said seat opening.

3. The portable, collapsible toilet of claim 1 wherein said fastening means includes a flap on said one endmost panel adapted to be adhered to said other endmost panel.

4. The portable, collapsible toilet of claim 1 further including notches for receiving the upper open end of a plastic bag to be nested within said four panels, said notches being located in said two opposite ones of said panels in adjacency to said intermediate one of said panels.

5. The portable, collapsible toilet of claim 4 wherein said notches are adjacent said fourth fold line.

6. The portable, collapsible toilet of claim 5 wherein said notches have narrow openings and enlarged bottoms.

7. The portable, collapsible toilet of claim 6 wherein the sides of said notches at said openings are in substantial abutment with one another to provide a means for gripping the plastic bag.

8. The portable, collapsible toilet of claim 1 wherein said securing means includes a tongue on said flap and a tongue receiving notch in said remaining one of said four panels.

9. The portable, collapsible toilet of claim 1 further including a second flap connected to an upper edge of said remaining one of said four panels by a fifth fold line.

10. The portable, collapsible toilet of claim 9 wherein said seat opening is defined by a die cut in said seat panel, said die cut being interrupted to define a hinge, whereby that part of said seat panel within said die cut forms a lid for selectively covering said seat opening.

11. The portable, collapsible toilet of claim 10 wherein said second flap extends into partial underlying relation with said lid to act as a stop for said lid.

12. The portable, collapsible toilet of claim 1 wherein each of said foldable tabs includes a first section connected to an upper edge of the corresponding said two opposite ones of said panels at a sixth fold line and a second section connected to the first section opposite of said sixth fold line at a seventh fold line, said second sections including noses received in respective ones of said first and second notches.

13. A portable, collapsible toilet made of a blank of rigid but foldable material, said blank having a row of four side by side panels connected by three fold lines to define a front panel, a rear panel and opposed side panels;

an endmost one of said panels in said row having a fastening means for securement to the other endmost panel in said row;

two opposite ones of said panels at their upper edges including foldable first flaps that may be directed toward each other when said toilet is erected whereby said flaps form opposed support surfaces at the upper edges of said panels;

a seat panel connected by a fourth fold line to one of said panels other than said opposite ones of said panels at an upper edge thereof and having a second flap adapted to overlie the upper edge of the remaining one of said four panels and said support surfaces;

means for securing said second flap to said remaining one of said panels;

a seat opening in said seat panel spaced bag mounting notches in at least one of said four panels and adjacent said fourth fold line.

14. The portable, collapsible toilet of claim 13 wherein said notches have narrow openings and enlarged bottoms.

15. The portable, collapsible toilet of claim 14 wherein the sides of said notches at said openings are in substantial abutment with one another to provide a means for gripping a plastic bag.

16. The portable, collapsible toilet of claim 13 wherein one of said side by side panels includes die cut means defining a toilet paper holder.

17. The portable, collapsible toilet of claim 16 wherein said die cut means is generally L-shaped.

* * * * *